UNITED STATES PATENT OFFICE.

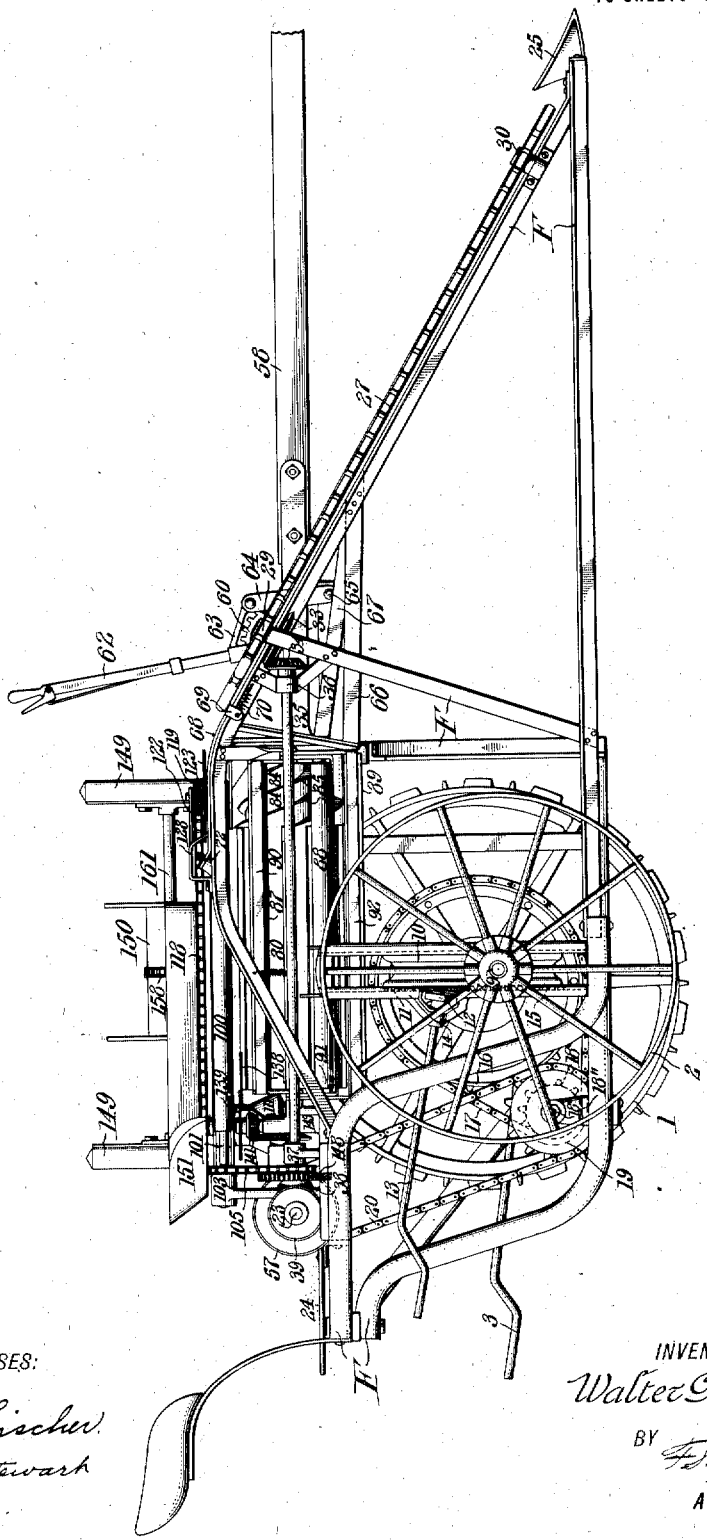

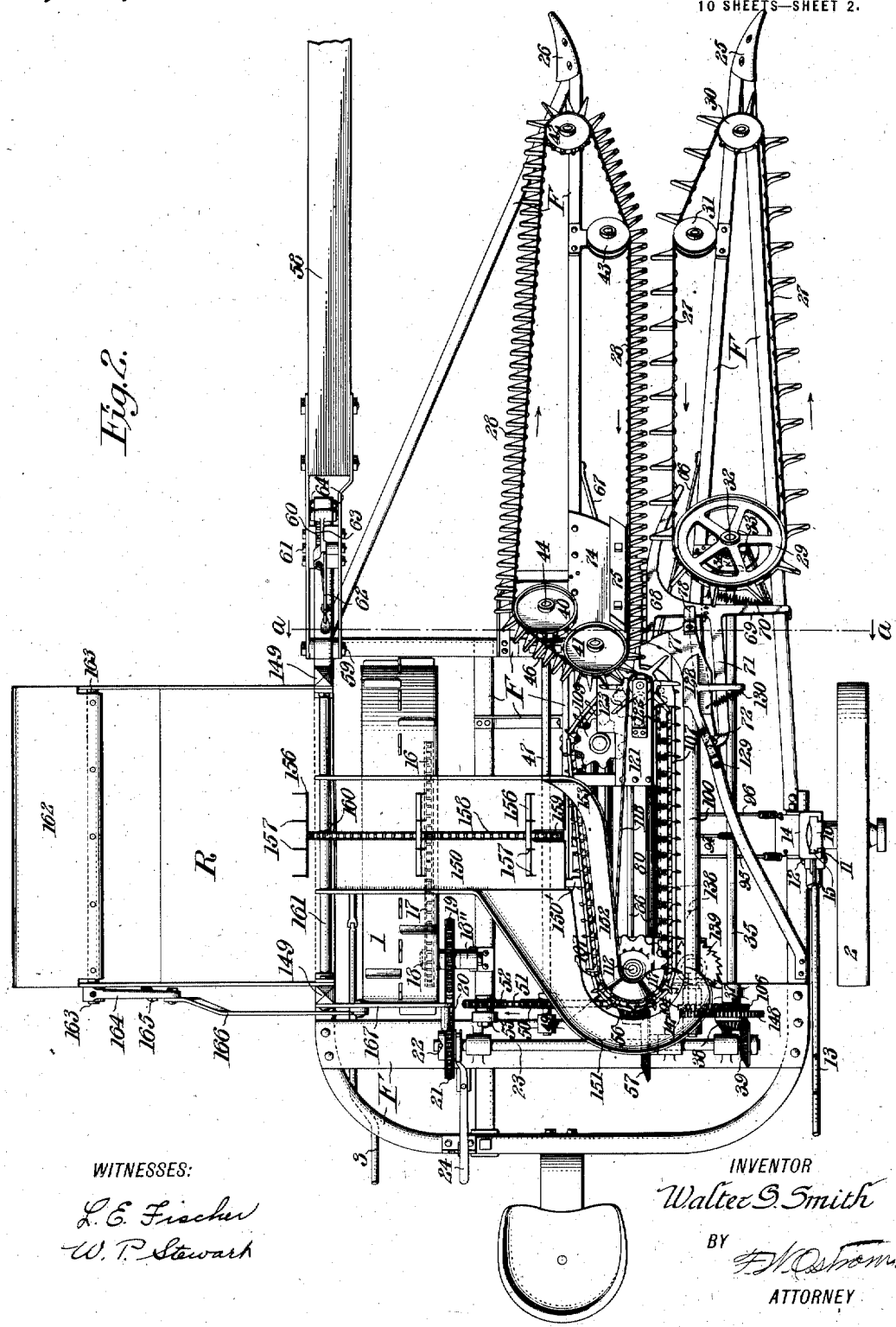

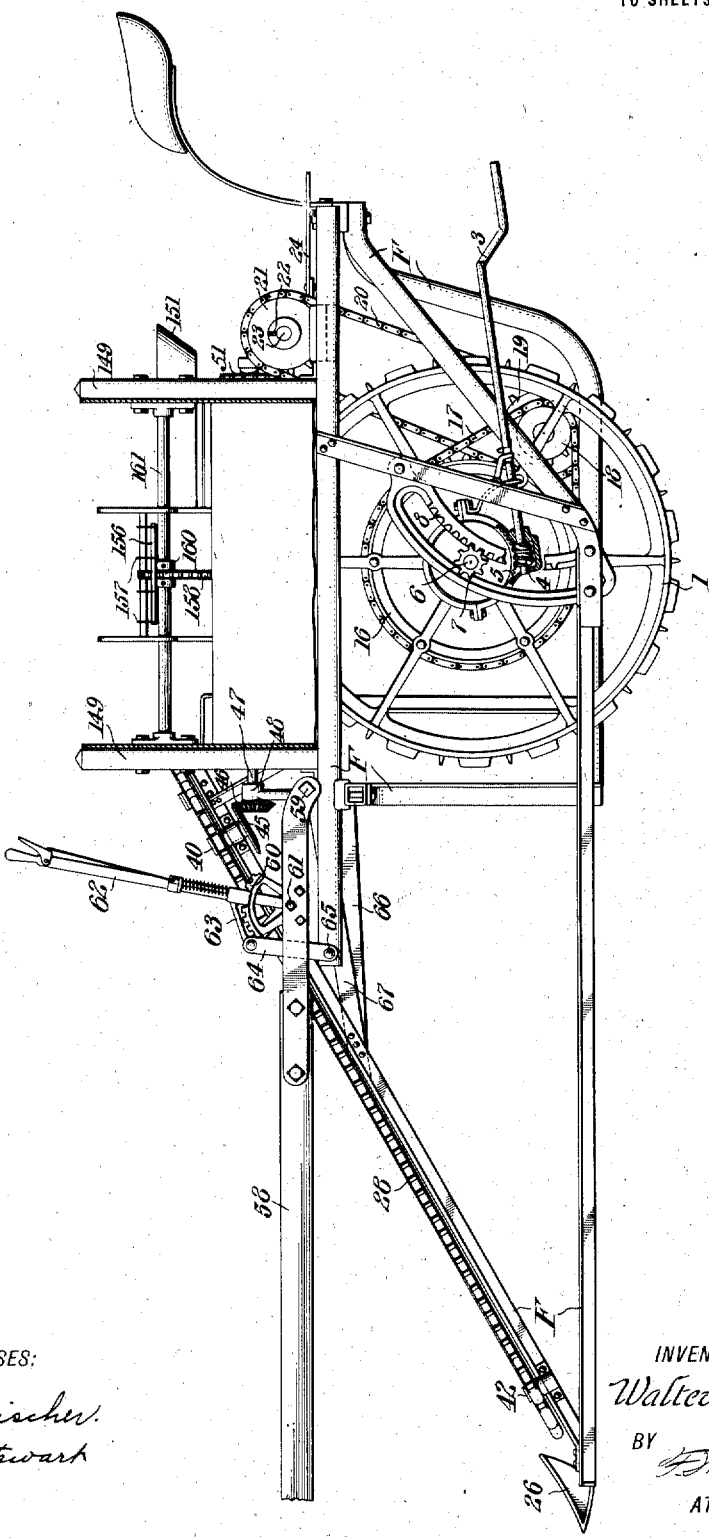

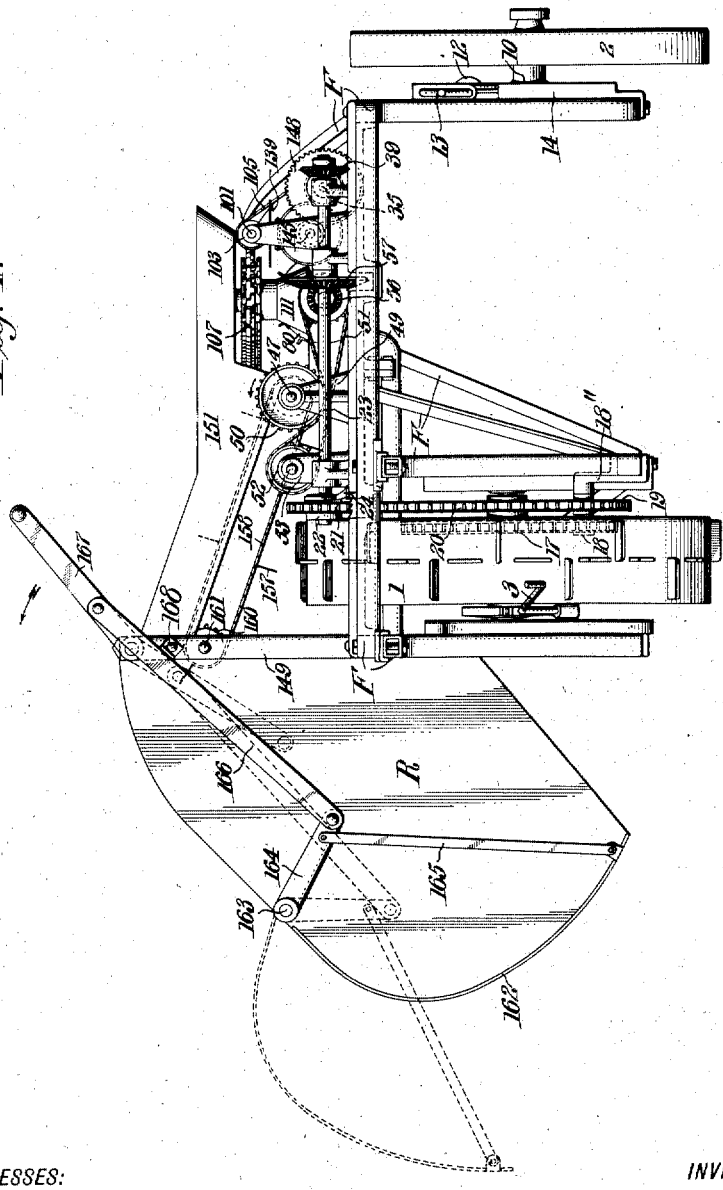

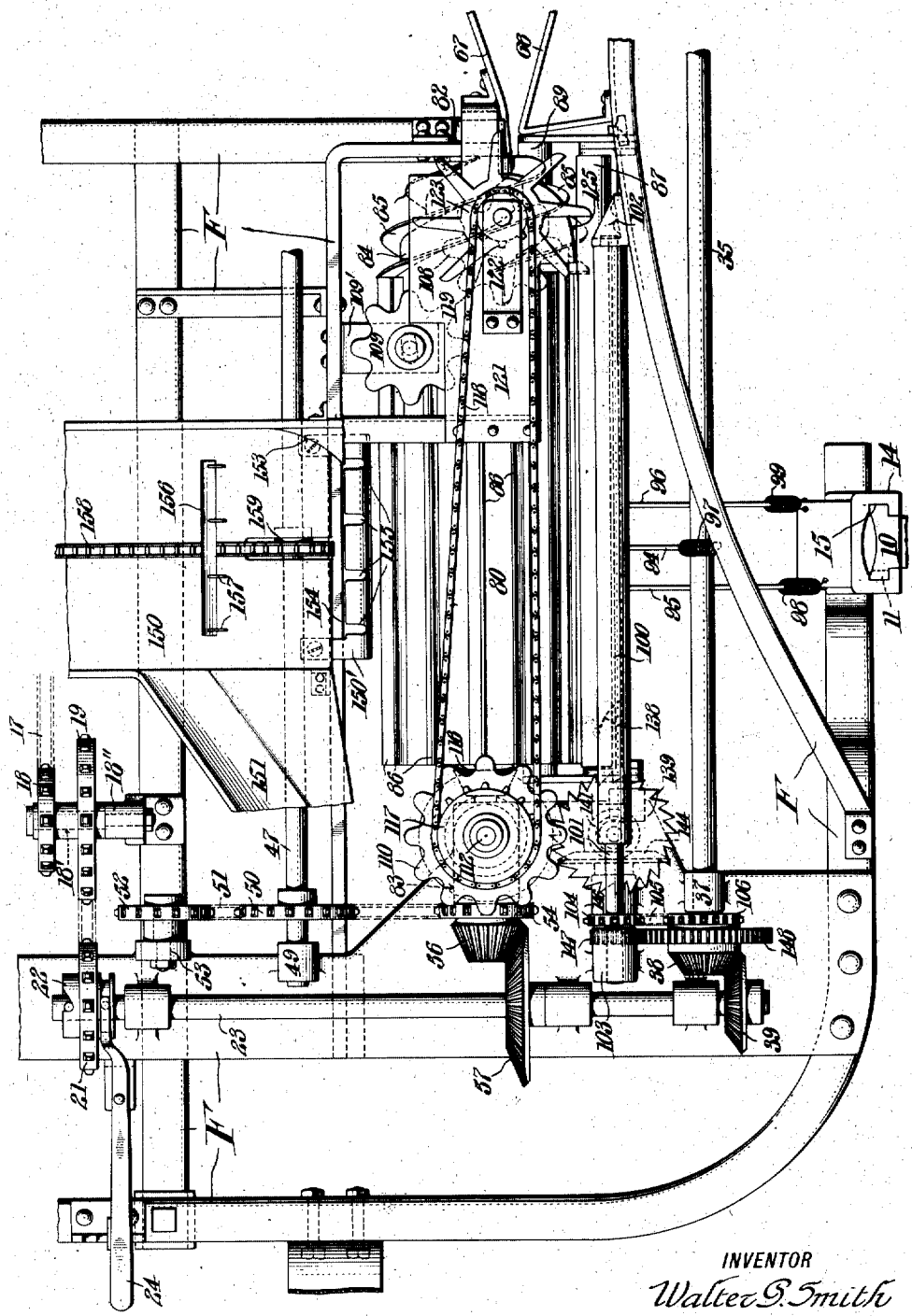

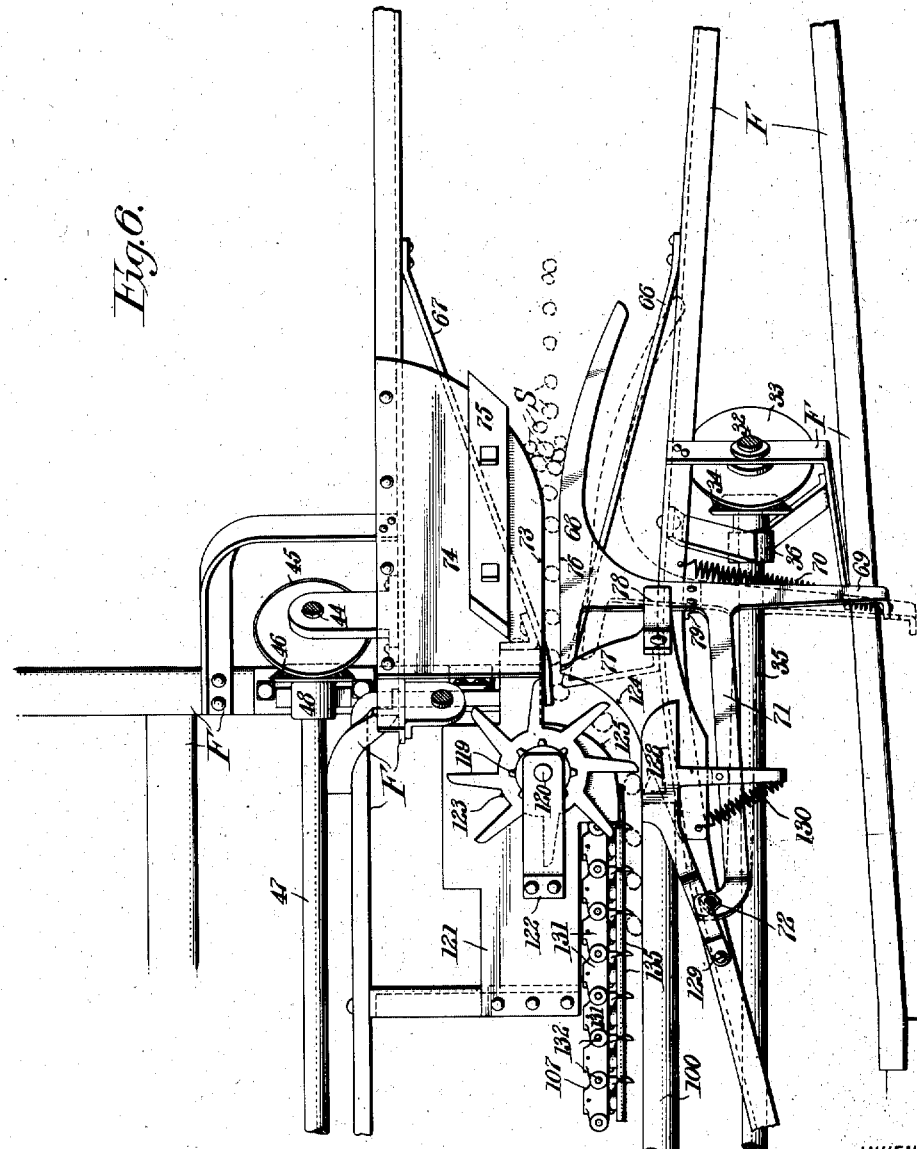

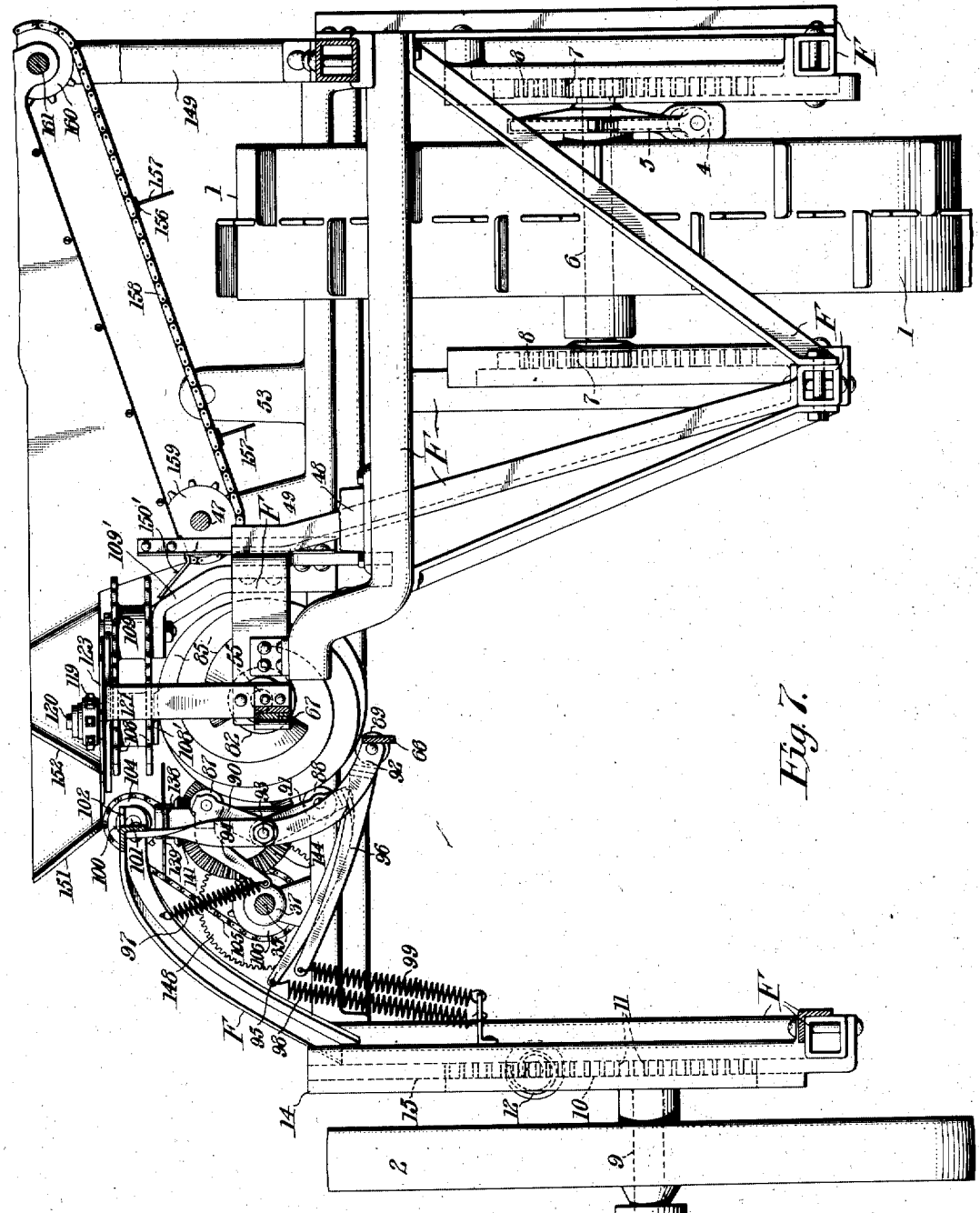

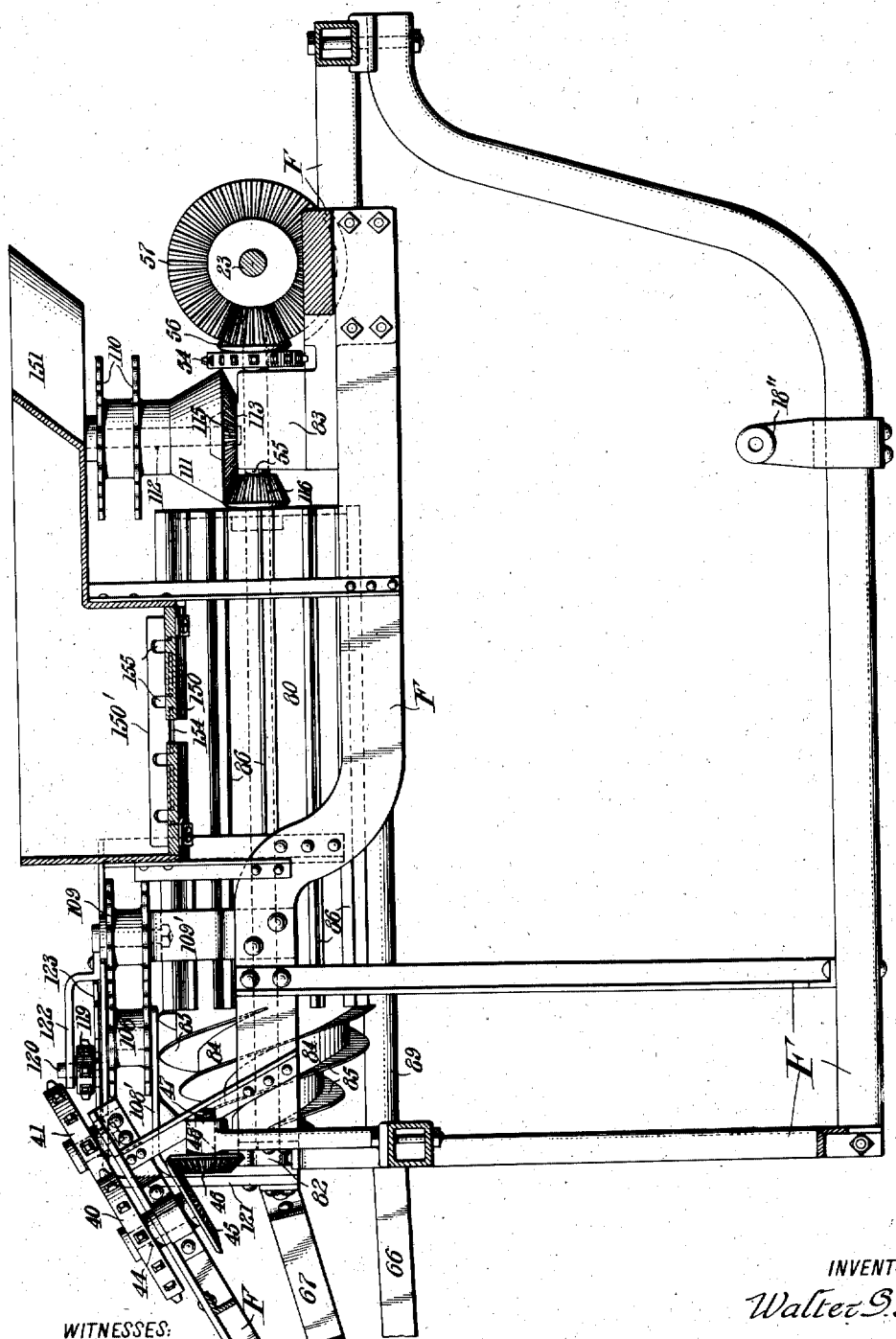

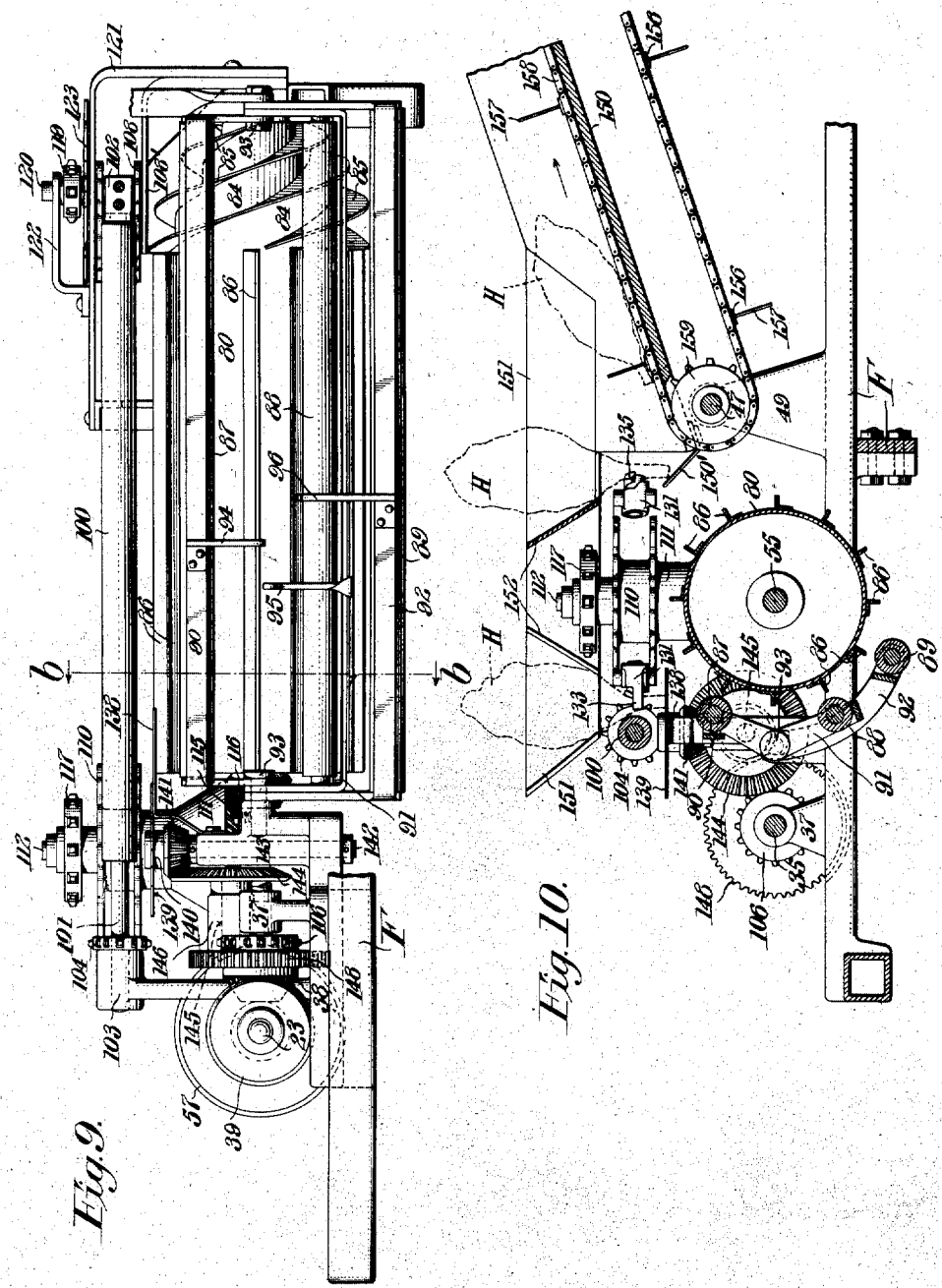

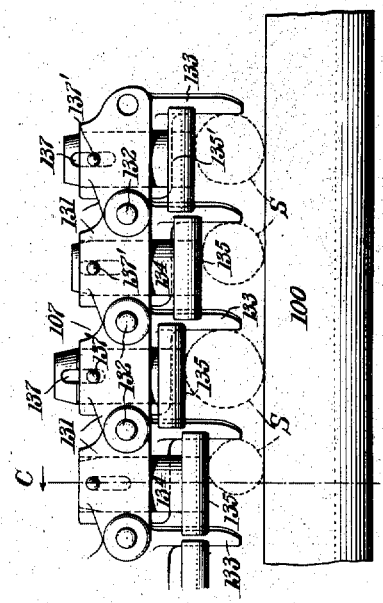

WALTER P. SMITH, OF PHOENIX, ARIZONA.

HARVESTING-MACHINE.

1,275,623.

Specification of Letters Patent.  Patented Aug. 13, 1918.

Application filed November 2, 1916.  Serial No. 129,145.

*To all whom it may concern:*

Be it known that I, WALTER P. SMITH, a citizen of the United States, residing at Scottsdale Star Route, Phoenix, in the county of Maricopa and State of Arizona, have invented certain new and useful Improvements in Harvesting - Machines, of which the following is a specification, reference being had therein to the accompanying drawings.

This invention relates to harvesting machines of the type known as heading machines and is particularly adapted to head such grain as milo maize, Kafir-corn and the like, which in their different types grow to irregular heights.

The primary object of the present invention is to provide a machine capable of severing the heads of the grain from their stalks at a substantially uniform distance from their heads.

A further object of this invention is to provide a machine of this type with a mechanism adapted to automatically gage the distance from the heads of the grain at which it is desired to sever the stalks.

A further object of the invention is to provide a mechanism adapted to present the stalks of the grain to a stalk severing device in such a manner as to sever the stalks at a uniform distance from the heads of the grain.

A still further object of this invention is to provide a machine of the kind described with a separating device having for its function the separation of clusters of grain-stalks.

Another object of this invention is to provide a mechanism in this class of machines, adapted to carry the severed heads away from the severing device and into a suitable receptacle supported by the machine.

Other objects of this invention will be apparent from the following description.

Referring to the drawings, Figure 1 represents a right side elevation of the machine, the draft-tongue being broken off. Fig. 2 is a top plan view of the machine as shown in Fig. 1. Fig. 3 is a left side elevation, omitting the grain-head receptacle. Fig. 4 is a rear end view of the machine omitting the driver seat. Fig. 5 is an enlarged top plan view of a portion of the machine and shows the drum with its coöperating parts. Fig. 6 is an enlarged top plan view of a portion of the machine showing more particularly the stalk separators. Fig. 7 is a transverse sectional view along the line *a—a*, Fig. 2, omitting several parts of the machine. Fig. 8 is a side elevation, partly in section, of several of the parts shown in Fig. 5 as viewed from the left side of the machine. Fig. 9 is an enlarged right side elevation of the drum, opposing rollers, and stalk severing mechanism as viewed from the right side of the machine. Fig. 10 is a detail sectional view of the line *b—b*, Fig. 9, and showing the grain-head conveyer. Fig. 11 is a detail sectional view of the drum and opposing rollers showing their action on the grain-stalks. Fig. 12 is a detail plan view of a section of the gaging device. Fig. 13 is a sectional view on line *c—c*, Fig. 12.

The main framework of the machine, designated generally as F, may be of any suitable construction and is shown supported by a driving wheel 1 and a non-driving or grain-wheel 2.

The height from the ground of the framework F and consequently the height of the machinery supported thereby may be varied by any suitable mechanism. In the present instance a well known adjusting device is employed, comprising a crank handle 3, provided with the worm 4 meshing with the teeth of the worm-wheel 5 fixed upon the driving-wheel supporting shaft 6. The shaft 6 carries, at its opposite ends, pinions 7 in mesh with the teeth on segmental rack-bars 8 secured to the framework F of the machine. The grain-wheel 2 is journaled upon a short shaft 9, projecting laterally from a vertically extending rack-bar 10, provided with teeth 11 along the edge extending toward the rear of the machine. The rack-teeth 11 are engaged by a worm 12 secured to a crank-handle 13 rotatably supported in a bearing extending from a standard 14, projecting upwardly from the framework of the machine and provided with a slideway 15 for the rack-bar 10, an opening in the standard permitting the worm to engage the teeth of the rack-bar. Suitable pawls may be provided to prevent accidental rotation of the crank-handles. It is evident that upon rotation of the crank-handles 3 and 13, the consequent actuation of the rack-bars raises or lowers the framework F as may be desired. Preparatory to commencing the heading of a field of grain, the machine is set by the means described to the height requisite for imposing as little strain as possible upon the other working parts of the machine.

In order to provide means for driving the several mechanisms of the machine, the driving-wheel 1 has secured thereto a main sprocket-wheel 16 connected by means of a chain 17 with a sprocket-wheel 18 adapted to rotate upon a stud 18' which is fixed upon a bracket 18'' secured upon the framework. Mounted to rotate with the sprocket-wheel 18 is a sprocket-wheel 19 connected, by means of a chain 20, with a sprocket-wheel 21 secured upon a sleeve 22 forming one member of a well known clutch device and adapted to be clutched to or unclutched from the main driving-shaft 23 upon actuation of the handle 24.

The framework of the machine is provided with the usual right and left divider-points 25 and 26, adapted to pick up and guide the grain-stalks to leading-in chains 27 and 28. The leading-in chain 27 is shown driven, in a direction indicated by arrows by the sprocket-wheel 29 and is guided by an idle sprocket-wheel 30 and an idle grooved-wheel 31 which may be adjustably carried by the framework of the machine. The driving sprocket wheel 29 is secured to a short inclined shaft 32 having a suitable bearing in the framework of the machine and having fixed thereto a bevel-gear 33 in mesh with a bevel-gear 34 upon one end of the horizontal shaft 35, journaled in bearings 36 and 37 and of which the other end carries a bevel-pinion 38 rotated from the bevel-gear 39 fixed upon the main-shaft 23. The leading-in chain 28 is shown driven, in a direction indicated by arrows, by a driving sprocket-wheel 40 and is guided by idle sprocket-wheels 41 and 42 and idle grooved-wheel 43 all or any of which may be adjustably carried by the framework of the machine. The sprocket-wheel 40 is fixed upon a short inclined shaft 44, journaled in a suitable bearing and having secured thereto a bevel-gear 45 meshing with bevel-gear 46 fixed upon one end of the horizontal shaft 47, journaled in bearings 48 and 49 provided in the machine framework, and of which the opposite end carries a sprocket-wheel 50. The sprocket-wheel 50 is rotated, in a direction opposite to that in which the bevel-pinion 38 is driven, by means of a chain 51, embracing the idle sprocket-wheel 52, supported in a bearing 53 and rotated by a sprocket-wheel 54 mounted to turn with a shaft 55, which carries a bevel-pinion 56 in mesh with the bevel-gear 57 secured upon the main-shaft 23.

As is common in this type of machines, there is employed a device for tilting the forward portion of the framework F of the machine in order to position the divider-points 25 and 26 and the leading-in chains 27 and 28 as close to the ground as may be required by fallen down stalks, and for the purposes of this machine any well known construction may be used. As shown in the drawings, the draft-tongue 58 is pivoted at 59 to the framework F and has rigidly secured thereto a segmental toothed rack 60. Pivoted on the tongue at 61 is an operating handle 62 carrying a spring-pressed pawl in engagement with the teeth on the rack 60. Rigidly secured to the handle 62 is an arm 63, pivotally connected with links 64 hinged at 65 to the framework F. By means of the device described, when the handle 62 is swung on its pivot, the forward framework of the machine may be raised or lowered in a well known manner.

Coöperating with the leading-in chains 27 and 28 in guiding the grain-stalks are two converging guide bars 66 and 67, secured to the framework and the active portions of which terminate near the delivery end of the leading-in chain 28.

Means are provided for separating any clusters of grain-stalks that may have formed and thereafter feeding them singly to a gaging device. The means employed in the present instance, for this purpose, comprises a curved separating-blade 68 having a tail portion 69 connected by means of a spring 70 with the framework, with which the separating-blade 68 has a pivotal connection upon the lateral extension 71 thereof pivoted at 72. The spring 70 normally holds the separating-blade 68 with a yielding pressure against the stalks, which as clearly shown in Fig. 6 are pressed against the active edge 73 of a buffer-plate 74 rigidly secured to the framework. This buffer-plate 74 carries a block 75 to prevent sagging of the leading-in chain 28. The active edge 76 of the separating-blade and the active edge 73 of the buffer-plate converge to a distance approximately the average widths of the stalks, thereby effecting the separation of any clusters thereof under the opposing action of the edges 73 and 76 and the continued feed of the leading-in chain 28. Wobbling of the separating-blade 68 is prevented by compelling it to slide between the upper surface of a bracket 77 and the lower surface of a plate 78 secured thereto, while a stop 79 prevents excessive swinging of the blade 68 under the action of the spring 70.

Up to the delivery point of the chain 28, the stalks remain substantially vertical, following which their upper portions are bent laterally by a mechanism about to be described. A substantially horizontal drum 80 is fixed upon the shaft 55 journaled in bearings 82 and 83. The forward end of the drum 80 terminates in transversely surfaced spirals 84 and 85 of decreasing diameter, and the outer surface of the drum in the rear of the spirals is provided with diametrically projecting ribs 86 extending longitudinally thereof. Extending parallel with the drum are loosely mounted opposing rollers 87, 88 and 89, carried respectively by substantially U-shaped swinging frames 90, 91 and 92, fulcrumed on pivotal-pins 93, rigidly supported by the framework. The swinging frames 90, 91 and 92 are respectively provided with tail portions 94, 95 and 96 connected by means of springs 97, 98 and 99 to the framework of the machine, to normally press the rollers 87, 88 and 89 toward the drum 80.

Positioned parallel with and spaced horizontally and vertically from the drum 80 is a roller 100 rotating with its supporting shaft 101, journaled in bearings 102 and 103, and carrying sprocket-wheel 104 connected by means of a chain 105 with a sprocket-wheel 106 carried by the rotating shaft 35. Coöperating with the roller 100 to form a gaging device is a chain 107, the construction and function of which will be hereinafter explained in detail. The chain 107 is guided by the idle, double sprocket-wheel 108 supported on a bracket 108' provided for the purpose above the spirals 84 and 85, the idle, double sprocket-wheel 109 adjustably mounted upon the bracket 109' fixed upon the machine frame, and the driving double sprocket-wheel 110, carried by the casing 111 mounted to rotate upon the vertical shaft 112 fixed upon a boss 113 of the bearing 83 and rotated by means of a bevel-gear 115, which meshes with a bevel-pinion 116 fixed upon the drum supporting shaft 55. Carried by the upper end of the sleeve 111 is a driving sprocket-wheel 117 connected by means of the chain 118 with the sprocket-wheel 119 sleeved upon the bearing-stud 120 secured to the brackets 121 and 122. Fixed upon the sleeve carrying the sprocket-wheel 119 is a feed-wheel 123.

The grain-stalks are delivered by the leading-in chain 28 to the action of the drum spirals 84 and 85 and of the feed-wheel 123. The spiral 84 deflects the upper portion of the stalks laterally, while the spiral 85 feeds them rearwardly, the action of both spirals being aided by the feed-wheel 123. During this actuation, the stalks are guided by the curved surfaces 124 and 125, respectively of the stationary brackets 77 and 121. If desired, a secondary separating-blade 128 pivoted at 129 to the frame-work and pressed against the stalks under the action of the spring 130 may be employed for insuring that no stalk clusters remain and may act in a manner similar to the main blade 68. The grain-stalks are in this manner fed singly into contact with the ribs 86 of the rotating drum 80 against which they are held in kinked fashion by the action of the rollers 87, 88 and 89.

The portions of the stalks above the drum are seized by the chain 107. The links of the chain, particularly illustrated in Figs. 12 and 13, comprise bearing members 131, connected by means of pins 132 and provided with projecting stalk-feeding fingers 133. Slidingly mounted within the bearing members 131 and yieldingly held against the grain-stalks are plungers 134 having transverse stalk-engaging heads 135 rounded off at 135' for contact with the grain-heads. The plungers 134 are pressed outwardly by springs 136 and are guided by slots 137, formed in the plungers 134, and pins 137' secured to the bearing members 131. By yieldingly holding the plungers 134 against the stalks, which are held on the opposite sides by the roller 100, they adjust themselves for different thicknesses of stalks.

It will be evident, from an examination of Fig. 11, that the rotation of the drum 80 in the direction indicated by an arrow forces the stalks S downwardly until their heads H are caught between the rounded off surfaces 135' of the plungers 134 and the curved surface of the roller 100. The rotation of the roller 100 in a direction opposite to that in which the drum 80 is rotated counteracts to some extent the action of the drum and acts to prevent the latter from forcing the heads of the stalks below the chain 107. Further downward movement of the stalks being prevented, the drum 80 in its rotation slips past the stalks S while the continued feed of the chain 107 and the advance of the machine causes the stalks to slip longitudinally of the roller until they are presented to a severing device.

The stalk severing device comprises a stationary ledger-blade 138, secured to the framework, and a rotating knife 139 coöperating therewith. The knife 139 may, as shown, be secured to a sleeve 140, rotating with bevel-pinion 141, mounted upon a shaft 142 supported in a bearing 143. The bevel-pinion 141 meshes with a bevel-gear 144 fixed upon a shaft 145, journaled in a bearing 146 and rotated by intermeshing spur gears 147, 148 from the shaft 35. As the grain-stalks are presented by the gaging device in the manner described to the knife blades 138, 139 they are severed thereby at, or at a substantially uniform distance from their heads. The stalks pass through an open space provided in the framework for the purpose and by their own resiliency readily recover from the former bending thereof.

The severed heads H of grain are from this point conveyed into a suitable receptacle designated generally as R and supported upon standards 149 secured to the framework. As they are carried away from the knife-blades by the chain 107, the severed heads are supported and guided by a trough-like lateral extension of a platform 150, and comprising inclined sides 151, 152, which substantially follow the path of the chain 107 upon opposite sides thereof. The inclined side 151 merges into a vertical side wall of the platform 150 and the inclined side wall 152 is curved at 153 to cross the chain 107, and merges into the opposite vertical side wall of said platform, thereby serving to cast the grain-heads upon the platform 150. In order to prevent the grain-heads from falling between the platform 150 and the chain 107 an inclined baffle-plate 150' is secured to the platform 150 and is suitably slotted at 154 and 155 for the passage of transverse bars 156, together with feed-prongs 157 carried thereby. The bars 156 are carried by a chain 158 driven by a sprocket-wheel 159 and supported by an idle sprocket-wheel 160 journaled on a rod 161 carried by the standards 149. The driving sprocket-wheel 159 is mounted to rotate with the shaft 47 heretofore referred to.

The grain-heads cast upon the platform 150 are carried by the feed-prongs 157 into the receptacle R. Means are provided for emptying this receptacle at desired intervals by means of a door 162 fixed upon a rod 163, carrying a lateral arm 164, connected by means of a brace 165 with an ear upon the free end of the door. The lateral arm 164 also has link 166 connection with a crank-arm 167, pivoted to one of the standards 149. By rotating the crank-arm 167 as indicated in dotted lines in Fig. 4, the door 162 will be forced open and the grain-heads will be precipitated from the receptacle. This construction enables a lug 168, secured to the standard, to hold the door in either open or closed position, as the link 166 in either position lies below the pivotal point of the crank-arm 167.

As the operation of the several mechanisms employed in this machine are apparent from the foregoing description, it is not deemed necessary to recapitulate the same.

Having thus set forth the nature of the invention, what I claim herein is:—

1. In a grain-heading machine, in combination, a gaging device, a grain-stalk feeding mechanism, means for kinking the grain-stalks until the grain-heads are forced downwardly into contact with said gaging device, and grain-stalk severing means.

2. In a grain-heading machine, in combination, a gaging device, means for kinking the grain-stalks until the grain-heads are forced downwardly into contact with said gaging device, and means spaced from said gaging device for severing the gaged grain-stalks at a substantially uniform distance from the grain-heads.

3. In a grain-heading machine, in combination, a combined grain-head gaging and grain-stalk feeding device, means for kinking the grain-stalks until the grain-heads are forced downwardly into contact with said gaging device, and grain-stalk severing means.

4. In a grain-heading machine, in combination, a gaging device adapted to yieldingly engage grain-stalks, means acting on the grain-stalks intermediate said gaging device and the ground to kink the grain-stalks and force the grain-heads downwardly into contact with said gaging device, and grain-stalk severing means.

5. In a grain-heading machine, in combination, a frame adapted to be moved across a field, a gaging device movable longitudinally of said frame and adapted to yieldingly engage grain-stalks, means acting upon the grain-stalks in a direction transverse to the direction of movement of said gaging device to kink the grain-stalks until the grain-heads contact with said gaging device, and grain-stalk severing means.

6. In a grain-heading machine, in combination, a frame adapted to be moved across a field, a gaging device, means for feeding the grain-stalks longitudinally of said frame to said gaging device and to impart an initial kink to said stalks, means for further kinking the grain-stalks gripped by the gaging device to force the grain-heads into contact with said gaging device, and grain-stalk severing means.

7. In a grain-heading machine, in combination, a frame adapted to be moved across a field, a grain-stalk feeding chain supported by said frame and adapted to be moved longitudinally thereof, a roller rotating in a direction transverse to the direction of movement of said chain, means carried by said chain for yieldingly holding the grain-stalks against said roller, means for kinking the grain-stalks to cause them to slide downwardly past the rotating roller until the grain-heads contact therewith, and means for severing the grain-stalks.

8. In a grain-heading machine, in combination, a gaging device, means for feeding the grain-stalks to said gaging device, means for kinking said grain-stalks to force the grain-heads downwardly into contact with said gaging device, a device for severing the grain-stalks, and means for carrying the severed grain-heads away from said gaging device.

9. In a grain-heading machine, in combination, a gaging device, means for presenting the grain-stalks to said gaging device including spirals acting in a direction to feed the grain-stalks to said gaging device and to impart an initial kink to said grain-stalks in a direction transverse to said direction of feed.

10. In a grain-heading machine, in combination, a gaging device, adapted to yieldingly grip grain-stalks, a rotating drum and rollers opposed to said drum for kinking the grain-stalks and force the grain-heads downwardly into contact with said gaging device, and means for severing the grain-stalks.

11. In a grain-heading machine, the combination with a frame adapted to be moved over a field, of means for feeding grain-stalks longitudinally of said frame, a gaging device adapted to yieldingly grip the grain-stalks, means acting upon said stalks in a direction transverse to said direction of feed to cause the stalks to slip downwardly past the gaging device until the grain-heads contact with said gaging device, and means spaced from said gaging device for severing the grain-stalks at a substantially uniform distance from the grain-heads.

12. In a grain-heading machine, automatic means for severing grain-stalks, projecting from the ground, at a substantially uniform distance from the grain-heads including grain-stalk severing means, gaging means, and means for relatively moving the grain-stalks and the gaging means lengthwise of said stalks.

In testimony whereof I have signed my name to this specification in the presence of two subscribing witnesses.

WALTER P. SMITH.

Witnesses:
M. SHEPARD,
S. P. EMBRY.